(12) United States Patent
Tipton et al.

(10) Patent No.: US 6,972,077 B2
(45) Date of Patent: Dec. 6, 2005

(54) CELLS AND ELECTRODES FOR ELECTROCOAGULATION TREATMENT OF WASTEWATER

(76) Inventors: Gary A. Tipton, 14910 Welcome La., Houston, TX (US) 77014; Harry M. Slack, Benito Juarez No. 102, Colonia San Lucas Tepetlacalco, Estado de Mexico (MX) CP 54045

( * ) Notice: Subject to any disclaimer, the term of this patent is extended or adjusted under 35 U.S.C. 154(b) by 349 days.

(21) Appl. No.: 10/446,766

(22) Filed: May 28, 2003

(65) Prior Publication Data

US 2004/0238365 A1 Dec. 2, 2004

(51) Int. Cl.$^7$ ............................................. C02F 1/463
(52) U.S. Cl. ................ 204/269; 204/275.1; 204/278.5; 204/660; 204/672; 204/673
(58) Field of Search ............................ 204/269, 275.1, 204/278.5, 660, 672, 673

(56) References Cited

U.S. PATENT DOCUMENTS 5,695,644 A * 12/1997 Buchanan et al. .......... 210/696
6,238,546 B1 * 5/2001 Knieper et al. ............. 205/742
6,309,519 B1 * 10/2001 Napper .................... 204/228.6

FOREIGN PATENT DOCUMENTS

| WO | WO 96/40591 | 12/1996 |
|---|---|---|
| WO | WO 98/17589 | 4/1998 |
| WO | WO 99/43617 | 9/1999 |

* cited by examiner

Primary Examiner—Roy King
Assistant Examiner—William T. Leader
(74) Attorney, Agent, or Firm—Keeling Patents & Trademark; Kenneth A. Keeling

(57) ABSTRACT

An apparatus for treating wastewater comprising an electrocoagulation cell 100 including holding and isolating members 7, a top cell cover 17, a plurality of electrode plates E1 through E8 inserted within a sleeve 18 made of non-conductive material, thereby the electrode plate sets 11 and 12 offer minimum resistance to the incoming liquid. Such an electrocoagulation cell 100 including a member to break the laminar liquid flow and to maintain a turbulent state all along said cell 100. A set of electrode plates 11 and 12 connected in parallel or in series, wherein said electrode plate sets 11 and 12 have connections arranged such that it allows the electrical current be indistinctively interrupted and reversed. Such an electrode plate set 11 and 12 connected in parallel or in series, wherein a combination of non-similar metals may be made in order to have electrical connections that allow disinfection of the treated liquid.

21 Claims, 3 Drawing Sheets

CELLS AND ELECTRODES FOR ELECTROCOAGULATION TREATMENT OF WASTEWATER

CROSS-REFERENCE TO RELATED APPLICATIONS

This application claims the benefit of international application PCT/US01/44530 filed on Nov. 29, 2001, which claims the benefit of application No. 011935 filed in Mexico on Nov. 30, 2000.

STATEMENT REGARDING FEDERALLY SPONSORED RESEARCH OR DEVELOPMENT

Not Applicable.

BACKGROUND OF THE INVENTION

1. Field of the Invention

This invention refers to cells and electrodes for the electrocoagulation treatment of wastewater.

2. Description of the Related Art

This invention relates a system and method for destabilizing wastewater contaminants, coming from either city or industrial wastewaters. Suspended, emulsified, or dissolved contaminants in water bodies are destabilized and precipitated by the introduction of an electrical current to the aqueous media. The wastewater flow passes in contact with the cells and electrodes for the electrocoagulation of contaminants.

As is well known in the prior art of this field, the electrolytic treatment of liquids allows separation of a wide range of contaminants, such as metals, protein solids, pathogen organisms, oil and fat emulsions, and other undesired substances. The electrolytic treatment of the prior art shows a reduced success in the purification of wastewater. Said prior art generally consists of applying an electric field to a liquid, which is contained in a chamber for the coagulation of the contaminants contained in the liquid, or by removing impurities found in the liquid. An example of said methods and apparatuses for the electrolytic treatment is disclosed in the publication of patent application PCT No. WO 9640591, wherein a flow of water containing said contaminants is passed through polarized means, which have an electric potential different from that of the ground, and then the wastewater is passed through an electrocoagulation chamber including a plurality of elongated electrodes or electrocoagulation plates, having different electric potentials between each electrode or plate. The cells have a plurality of holes to produce turbulence in the water flow, increasing the efficiency of the electrocoagulation treatment. Although the apparatus of this PCT application might have been appropriate for said purpose, a disadvantage of the same is that the step of passing the water flow through the apparatus required that the electrodes or electrocoagulation plates support a great water pressure in order to avoid plugging of the electrocoagulation plates. In order to support said great water pressure, the electrocoagulation plates or electrodes must be built with a size and strength sufficiently robust, thereby limiting the number of plates within a said volume, and reducing the available area for the electrocoagulation treatment.

Furthermore, the electrocoagulation plates require a greater voltage at the connecting line, in order to obtain the desired amperage in the electrical field created by the plates, since the surface area is limited by the fewer number of plates required by the high water pressure. Smaller electrocoagulation plates capable of supporting said water pressure may be used, however the ability to maintain the desired amperage is a trade off, since the available surface in the plates of an electrocoagulation apparatus is directly related to the amperage they may maintain. Additionally, the tortuous path of the water flow causes other problems, such as gases evolving from the electrolytic reactions within the chamber being trapped and producing and increase of pressure between the plates. Therefore, the use of a highly powered pump is needed in order to overcome the natural tendency of the water flow and avoid plugging of the electrocoagulation chamber.

Other examples of electrolytic treatments and apparatuses are disclosed in the publication of patent application PCT No. WO 9943617, wherein the invention refers to the conduction of gases formed in the electrocoagulation process as being allowed to rise to the top of the liquid line and vented to the atmosphere. Likewise, the solids, which precipitate out of the liquid stream, are carried by the liquid stream to a secondary separation. Any remaining solids can be removed as sludge through a drain in the bottom of the device. Said apparatus includes a cover to isolate the foam from the electrical connections of the plates to avoid moisture. Said device may be manufactured as a large industrial unit, a portable unit or a unit adapted for use within a home, wherein the device may be operated in a pressure controlled environment, thus eliminating the need for a pump. In a further embodiment, the voltage and amperage of the electrical field within the reaction chamber may be adjusted by placing selected reaction plates where the incoming line voltage may be kept at a constant, which eliminates the need for an additional transformer. However, the prior art invention provides no means for self cleaning for the electrodes plates. Nor does it provide any means for addressing water flow through the electrodes plates, nor a means to properly adjust the time for the application of electrical current to electrodes.

PCT patent application WO 9817589, wherein said invention refers to the apparatus for effluent including a chamber having an inlet and an outlet, a plurality of electrodes extending vertically in the chamber, and an electrical supply connected to the plurality of electrodes plates. The plurality of electrodes plates consist of a plurality of channels placed between the apparatus inlet and outlet wherein an electrical supply delivers polarity power to the first set of electrodes, and delivers electricity to the second set of electrodes. As in PCT No. WO 9943617, mentioned above, this prior art patent application has no self cleaning means for electrodes plates, provides no means for addressing water flow through the electrodes plates, and has no means to properly adjust the time for the application of electrical current to electrodes.

BRIEF SUMMARY OF THE INVENTION

This invention intends to provide cells and electrodes for the electrocoagulation treatment of wastewater, to achieve the following goals:

An object of this invention is to provide a vortex-type cover to the electrodes set of the electrocoagulation plates in order to impart a directed pattern to the liquid flow to be treated, and to each one of the electrodes sets of the plate. Upon establishing a directed pattern for the flow, breaking of the laminar flow pressure formed by the liquid flow passing in the form of sheets between the electrocoagulation plates is obtained, thereby achieving a turbulent state controlled by each one of the electro-sets from the input to the output of the liquid flow in the electrocoagulation plates.

Another object of this invention is to reverse the polarity of the electrodes at a set time, for self-cleaning of the electrodes plates.

Another object of this invention is to provide the electrocoagulation cell with a top cell cover in order to anchor the electrode holders, to position them in the center of the cell sleeve for better operability in the hydraulic facilities, and a vortex-type bottom cover in order to obtain a liquid vortex, to assure disturbance of the liquid laminar flow and maintenance of a turbulent state in the liquid flow passing throughout the cell.

Another object of this invention is to use a combination of metals in the electrical connections, either in series or in parallel, in order to convert salts into chlorine solutions or to disinfect water.

Other objects shall become apparent to those skilled in the art in the light of the following disclosure and the accompanying drawings.

DESCRIPTION OF THE INVENTION

This invention is mainly based on a set of electrode plates 11 and 12 inserted into a sleeve 18 made of a non-conductive material, which is usually a plastic material and preferably PVC. Therefore, the sets of electrodes 11 and 12 have plates at the center of the set being wider than the plates further from the center. The sets of electrode plates 11 and 12 are typically made of conductive metals such as iron and aluminum. In water treatments by electrocoagulation various metals are used, such as stainless steel, copper, lead, zinc, and titanium, among others. Metal alloys, as well as other conductive materials, such as coal and graphite, may also be used in this invention.

Figure 1:
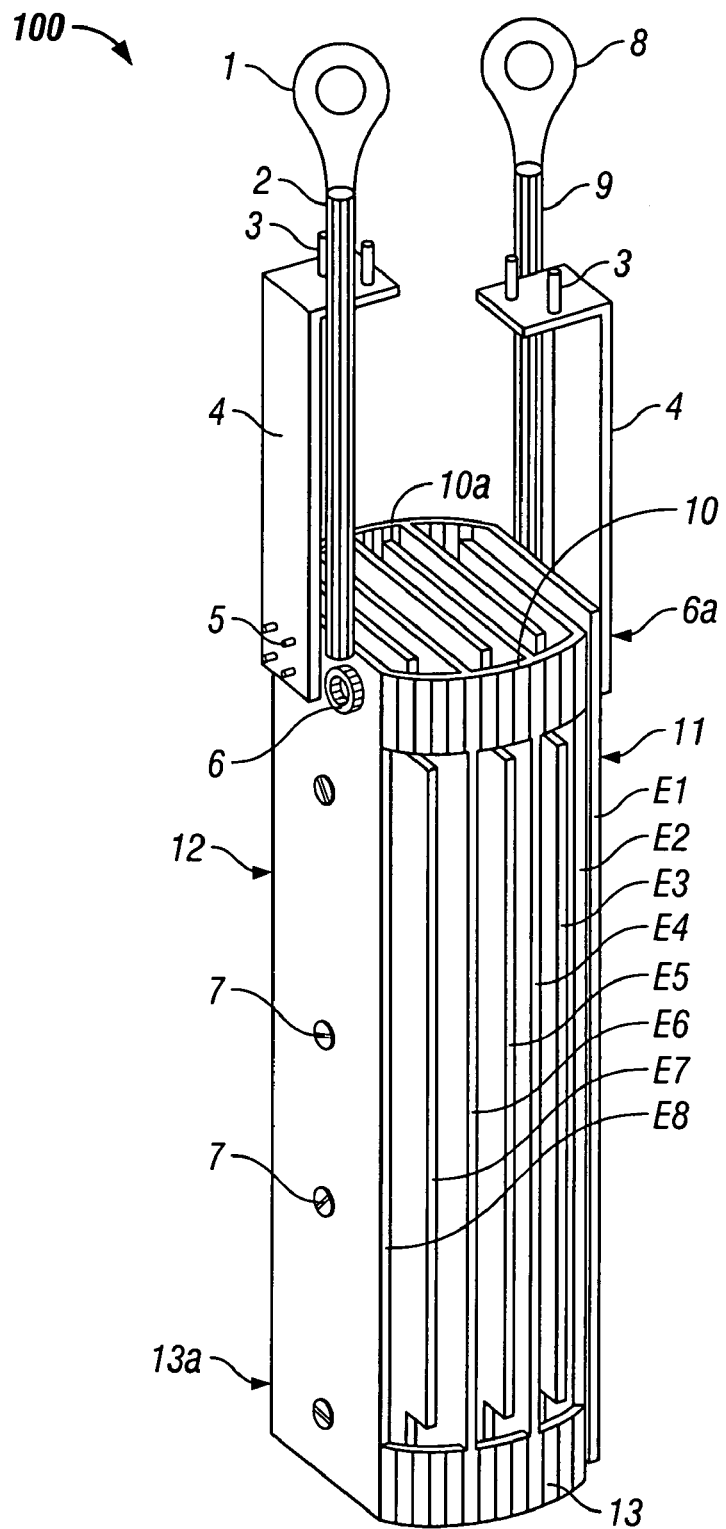
FIG. 1 is a perspective drawing of the interior of the cell and an electrode set for the electrocoagulation process of this invention.

FIG. 1 shows the interior of an exemplary electrocoagulation cell 100, being about 11 inches high and 3 inches wide, wherein the shoe for electric connection is a positive pole 1, which is joined to a positive heavy duty cable 2, same which is joined to a terminal 6. On the other side of the electrocoagulation cell there is a shoe to provide electrical connection to the negative pole 8, which is joined to a negative heavy duty cable 9. Cable 9 is joined to a terminal 6a (not shown) by one side of the negative heavy duty cable 9, being identical to the terminal 6. Non-conducting screws 3 joined to non-conducting holders 4 on both sides of the electrocoagulation cell are used in order to isolate and hold the top PVC cover 17 shown in FIG. 2, wherein said non-conducting holders 4 are joined to the side of electrode plate sets 11 and 12, by non-conducting screws 5. Electrode plate sets 11 and 12 of FIG. 1 are generally plates of a thickness between 1/8 inch and 1/4 inch. Said plates are separated and isolated from each other by non-conducting isolating separators 7 located on both sides of the electrode plates 11 and 12, and comprising a nut and a screw, both made of isolated non-conducting material, and passing through the plates leaving a gap between plates of plate set 11 and plates of plate set 12. The gaps may be varied to effect greater treatment potential as determined by the liquid being treated and being of 1/4 inch, preferably. Said non-conducting isolating separator 7 consists of a screw of 1/4 inch diameter by 3½ inch long, and being a 20 threads non-conducting screw. Electrode plates 11 are connected in negative parallel to a total of four negative electrode plates and electrode plates 12 are connected in positive parallel to a total of four positive electrode plates, requiring about 15 volts DC and 35 amperes.

Electrode plate sets 11 and 12 are connected to connection belts 10 and 10a, respectively, on the top and connection belts 13 and 13a, respectively, on the bottom. Connection belts 10 and 13 are conductive and made of the same material as the electrode plate sets 11 and 12. Connecting belts 10, 10a, 13 and 13a may be connected to their respective electrode plate sets 11 and 12 by welding. In the event that plate sets 11 and 12 are made of materials such as coal, graphite or other similar material, connection is made by fusion. At connection belts 10 and 13 the negative parallel electrode plates of plate set 11 are identified by odd numbering, such as E1, E3, E5 and E7. At the bottom connection belts 13 and 13a the positive parallel electrode plate set 12 consists of plates identified with even numbering, such as E2, E4, E6 and E8. However, the number of electrode plates in the electrocoagulation cell of this invention may vary in accordance to the liquid flow amount to be treated.

Identification of said connections using even and odd numbering has the purpose to connect even and odd poles to a current converter, not being an object of this invention, in order to indistinctively interrupt and reverse the current of the electrode plates set, be they positive or negative. When an electric charge is transmitted through an electrode plate, a magnetic field is created at each top or bottom end of the electrocoagulation cell. Upon interrupting and reversing the poles current the intensity of the magnetic field varies, effecting the charge of the contaminant particles contained in the liquid passing through electrocoagulation cell.

Due to the fact that hydrogen, oxygen, ozone and other gases are generated during the hydrolysis process at the surface of the electrode plates, the depolarization effect or change of polarity causes the metal ions of the electrode plates to be set free from the water molecules that have been depolarized or have been reformed from hydrogen and oxygen molecules generated by electrochemical reactions, and these molecules combined with other liberated contaminants so as to form larger particles thereby creating an electrochemical flocculation effect.

The arrangement and distribution of the electrode plate set 11 and 12 offer minimum resistance to liquid passing through the electrocoagulation cell, thereby causing minimum precipitation of the electrochemical coagulation solid products, that in great amounts produces plugging of the liquid flow through the electrocoagulation cells.

Figure 2:
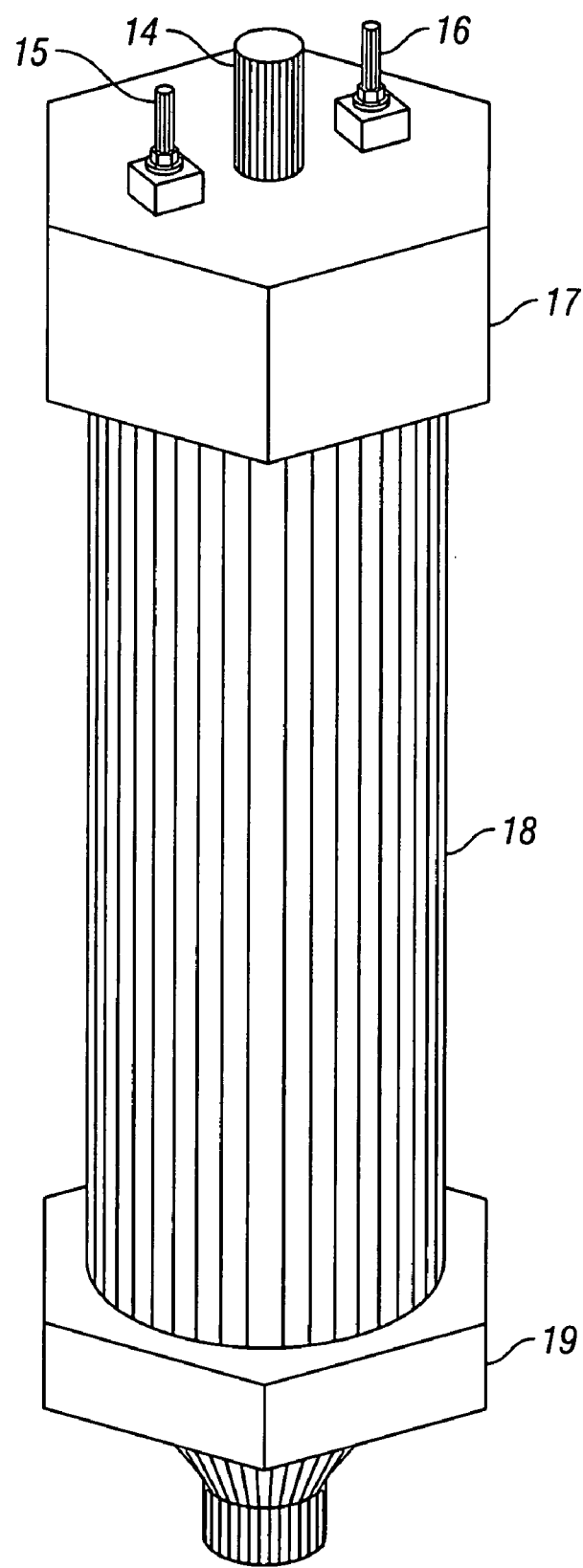
FIG. 2 is a perspective drawing of the assembled electrocoagulation cell embodiment of this invention.

FIG. 2 shows a perspective drawing of the completely assembled cell having a PVC nipple 14 allowing the exit of treated liquid; a sealed pin to prevent passing of liquid at negative pole 15, a sealed pin to prevent passing of liquid at positive pole 16 and a top PVC cover 17. In one embodiment, the top PVC cover 17 can hold the electrode plates 11 and 12 by means of non-conducting holders 4 to completely position and center the electrode plates set within the completely sealed PVC sleeve 18, in order to avoid treated liquid leakage or dropping. The top PVC cover 17 and the bottom vortex-type PVC cover 19 are sealed to the PVC sleeve 18 by means of threads and sealing material such as a thread tape, nylon yarn components and the like.

In one embodiment, the bottom vortex-type cover 19 may allow entrance of liquid to be treated through its conical shape, with a tilt angle of about 45° at the top and 3° at the bottom, preferably. However, said tilt angle may vary between 15° and 60° at the top of the cone and between 2° and 7° at the bottom of the cone. Said tilting angle of the vortex cone 19 varies in relation to the liquid flow pressure passing through the electrocoagulation cell in, FIG. 2.

The minimum pressure required is about 9 kg/cm$^2$ and the maximum pressure is about 60 kg/cm$^2$. When the liquid flow to be treated enters by the bottom vortex-type cover 19 it generates a liquid vortex in order to assure disruption of the liquid laminar flow at the entrance and to allow a turbulent state in the liquid flow all along the passing way by the electrocoagulation cell of this invention.

Figure 3:
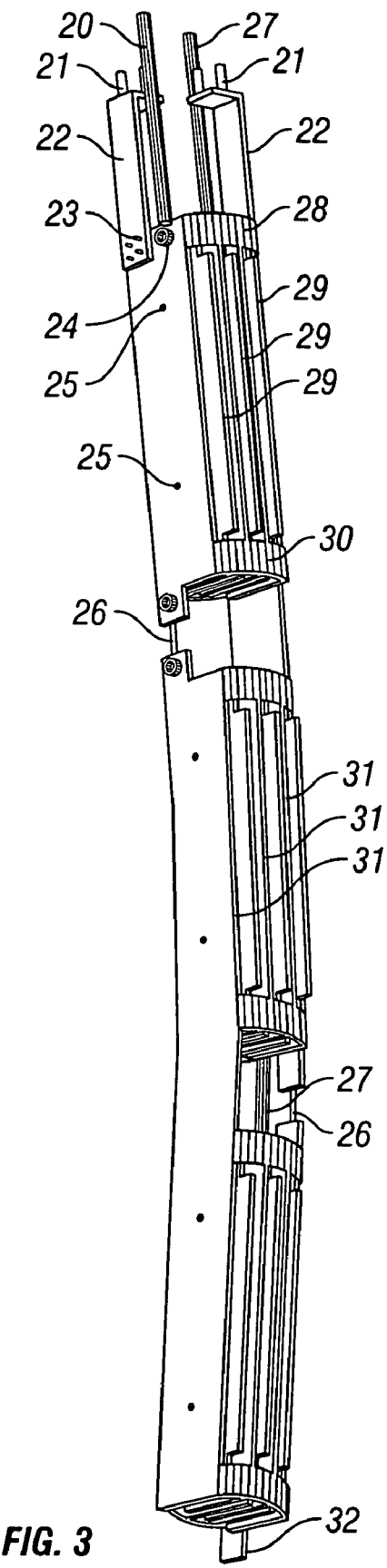
FIG. 3 is a perspective drawing of the interior of the electrocoagulation cell and electrodes set embodiment of this invention.

FIG. 3 shows another embodiment of this invention and consists in the joining of three sectors, 11 inches length and 3 inches wide, of FIGS. 1 and 2, wherein the difference is that the electrode plate set is connected in series. However, the voltage required for three sectors is normally three times higher than in the single sector configuration. Therefore, the embodiment of FIG. 3 requires 45 volts DC and 35 amperes. For this reason, the efficiency of this embodiment increases up to about 300 percent, due to the following factors:

a. The contact time with the electrode plates 29 and 31 increases three times.

b. The residence time in the treating zone for a set volume increases three times.

c. The number of electrodes required to generate desired amperage in each cell sector for treating the same volume of liquid is about 67% lesser due to the use of an in-series configuration of the electrode sets 29 and 31.

d. Turbulent flow is maintained while liquid passes through the set of electrodes 29 and 31.

e. The sectors of electrode plate sets 29 and 31 may be composed of non-similar metals as well as varied spacing.

Changes to this embodiment include the same fittings of FIG. 2, such as a PVC sleeve 18, a top PVC cover 17, a bottom vortex-type PVC cover 19. Likewise, as it is evident from FIG. 3, the rest of the fittings such as the positive pole heavy duty cable 20, the non-conducting screws 21, the non-conducting holders 22, the terminal 24, the non-conducting screws 23 for the holder 22, the non-conducting separators for electrode plates 25, the negative pole heavy duty cable 27, the top connecting belt 28, the bottom connecting belt 30, are the same elements of this invention.

Changes made in this embodiment do not include changes out of the scope of the unity of this invention, however this invention includes any change within the scope and spirit of the same.

The connectors 26 are optional and change the electrode plate sets 29 and 31 to render them into an in-series connection when disconnected, instead of a parallel connection when connected. The bottom terminal 32 has the purpose of connecting all the sectors in series.

What is claimed is:

1. An electrocoagulation cell for treating wastewater comprising:
    a nonconductive sleeve, a cell axis, a cell first end and a cell second end;
    a liquid inlet at said cell first end;
    at least two electrode plate sets positioned within said sleeve;
    each of said electrode plate sets comprising a plurality of electrode plates;
    holding and isolating members intermediate to said electrode plates;
    each of said electrode plates aligned with said cell axis; and
    turbulence means to induce turbulent flow of liquid within said cell.

2. The electrocoagulation cell of claim 1, wherein:
    said electrode plate sets comprising a first electrode plate set and a second electrode plate set;
    said first electrode plate set and said second electrode plate set having opposed electrical charges; and
    conversion means to allow reversal of the charge of said first electrode plate set and said second electrode plate set.

3. The electrocoagulation cell of claim 2, wherein:
    each of said electrode plates of said first electrode plate set electrically connected to the other electrode plates of said first electrode plate set;
    each of said electrode plates of said second electrode plate set electrically connected to the other plates of said second electrode plate set; and
    said plates of said first electrode plate set and said plates of said second electrode plate set in spaced and parallel arrangement such that each electrode plate of said first electrode plate set is in spaced proximity to an electrode plate of said second electrode plate set.

4. The electrocoagulation cell of claim 1, wherein:
    said turbulence means comprising a conical inlet at said cell first end to induce vortex flow in said cell.

5. The electrocoagulation cell of claim 4, wherein:
    said conical inlet having a first section and a second section;
    said first section having a continuous first section wall;
    said second section having a second section wall;
    the angle between opposed segments of said first section wall within a range of 15° to 60°; and
    the angle between opposed segments of said second section wall within a range of 2° to 7°.

6. The electrocoagulation cell of claim 1, wherein:
    said holding and isolating members comprising at least one non-conductive holder intermediate said sleeve and at least two of said electrode plates; and
    non-conductive separators intermediate said plurality of electrode plates to maintain a spacing between each of said plurality of electrode plates and adjacent electrode plates.

7. An electrocoagulation cell for treating a wastewater comprising:
    a nonconductive sleeve, a cell axis, a cell first end and a cell second end;
    a liquid inlet at said cell first end;
    a first electrode plate set and a second electrode plate sets positioned within said sleeve;
    each of said electrode plate sets comprising a plurality of electrode plates;
    non-conductive holders intermediate said cell sleeve and at least two of said electrode plates;
    non-conductive separators intermediate said plurality of electrode plates;
    said first electrode plate set and said second electrode plate set having opposed electrical charges;
    conversion means to allow reversal of the charge of said first electrode plate set and said second electrode plate set;
    each of said electrode plates of said first electrode plate set electrically connected to the other electrode plates of said first electrode plate set;

each of said electrode plates of said second electrode plate set electrically connected to the other plates of said second electrode plate set;

said plates of said first electrode plate set and said plates of said second electrode plate set in spaced and parallel arrangement such that each electrode plate of said first electrode plate set is in spaced proximity to an electrode plate of said second electrode plate set;

each of said electrode plates aligned with said cell axis; and a conical liquid inlet to induce turbulent flow of liquid within said cell.

8. An electrocoagulation cell for treating a wastewater comprising:

a non-conductive sleeve;

said sleeve having a sleeve axis;

said sleeve having a sleeve first end and a sleeve second end;

a plurality of sectors within said sleeve;

each said sector comprising a first electrode plate set and a second electrode plate set;

each said first electrode plate set and each said second electrode plate set having a plurality of electrode plates;

a plurality of holding and isolating members to maintain said electrode plates in spaced, parallel position;

each said sector having a first sector end and a second sector end;

said sectors arranged in end-to-end relationship within said sleeve;

a liquid inlet at said sleeve first end;

said sectors electrically connected in series.

9. The electrocoagulation cell in claim 8, wherein:

said electrode plates within one sector are constructed of differing conductive materials than the electrode plates of an adjoining sector.

10. The electrocoagulation cell in claim 8, wherein:

the spacing between electrode plates within one sector is different from the spacing between electrode plates of an adjoining sector.

11. The electrocoagulation cell of claim 8 comprising:

within each sector, each said first electrode plate set having an opposed electrical charge from each said second electrode plate set; and conversion means to allow reversal of the charge of each said first electrode plate set and each said second electrode plate set.

12. The electrocoagulation cell of claim 8 comprising:

turbulence means to induce turbulent flow of liquid within said cell.

13. The electrocoagulation cell of claim 12, wherein:

said turbulence means comprising a conical inlet at said sleeve first inlet to induce vortex flow in said cell.

14. The electrocoagulation cell of claim 13, wherein:

said conical inlet having a first section and a second section;

said first section having a continuous first section wall;

said second section having a second section wall;

the angle between opposed segments of said first section wall within a range of 15° to 60°; and the angle between opposed segments of said second section wall within a range of 2° to 7°.

15. The electrocoagulation cell of claim 8, wherein:

each said holding and isolating member comprising at least one non-conductive holder intermediate said plurality of electrode plates and said sleeve; and a plurality of non-conductive separators intermediate said plurality of electrode plates to maintain a spacing between each of said plurality of electrode plates and adjacent electrode plates.

16. The electrocoagulation cell of claim 8, wherein:

within each sector, each of said electrode plates of each said first electrode plate set electrically connected to the other electrode plates of each said first electrode plate set;

each of said electrode plates of each said second electrode plate set electrically connected to the other plates of each said second electrode plate set; and said plates of each said first electrode plate set and said plates of each said second electrode plate set positioned in spaced, parallel order such that each electrode plate of each said first electrode plate set is in spaced proximity to an electrode plate of each said second electrode plate set.

17. The electrocoagulation cell of claim 8, wherein:

one said electrode plate set of at least one sector connected to a positive pole of a power supply;

another said electrode plate set of at least one sector connected to a negative pole of said power supply; and at least one said electrode plate set of each sector connected to at least one electrode plate set of an adjoining sector.

18. The electrocoagulation cell in claim 8, wherein:

an electrically conductive conductor connecting adjoining sectors such that adjoining conductors are electrically connected in parallel.

19. An electrocoagulation cell for treating a wastewater comprising:

a non-conductive sleeve;

said sleeve having a sleeve axis;

said sleeve having a sleeve first end and a sleeve second end;

a plurality of sectors within said sleeve;

each said sector comprising a first electrode plate set and a second electrode plate set;

each said first electrode plate set and each said second electrode plate set having a plurality of electrode plates;

each said sector having a first sector end and a second sector end;

said sectors arranged in end-to-end relationship within said sleeve;

a liquid inlet at said sleeve first end;

said electrode plates aligned with said sleeve axis; and said sectors electrically connected in series.

20. The electrocoagulation cell in claim 19, wherein:

said electrode plates within one sector constructed of differing conductive materials than said electrode plates of an adjoining sector.

21. The electrocoagulation cell in claim 19, wherein:

said spacing between electrode plates within one sector different from said spacing between electrode plates of an adjoining sector.

* * * * *